(12) United States Patent
Saito (10) Patent No.: US 6,295,079 B1
(45) Date of Patent: Sep. 25, 2001

(54) SCANNING OPTICAL UNIT (75) Inventor: Kenichi Saito, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/505,767

(22) Filed: Feb. 17, 2000

(30) Foreign Application Priority Data

Feb. 22, 1999 (JP) .................................................. 11-042798

(51) Int. Cl.$^7$ .................................. B41J 2/47; G02F 1/33
(52) U.S. Cl. .......................... 347/255; 347/239; 359/305; 359/314
(58) Field of Search ...................................... 347/239, 241, 347/243, 255, 256, 259, 260, 261; 359/305, 306, 312, 313, 314, 298; 358/298, 481

(56) References Cited

U.S. PATENT DOCUMENTS

| | | | |
|---|---|---|---|
| 4,205,348 | * 5/1980 | DeBenedictis et al. | 358/481 |
| 4,269,482 | * 5/1981 | Mori | 359/312 |
| 4,775,896 | * 10/1988 | Umeda et al. | 358/298 |
| 5,175,642 | * 12/1992 | Funato | 359/298 |

FOREIGN PATENT DOCUMENTS 6-202016   7/1994   (JP) ................................ G02B/26/10

* cited by examiner

*Primary Examiner*—N. Le
*Assistant Examiner*—Hai C. Pham
(74) *Attorney, Agent, or Firm*—Sughrue, Mion, Zinn Macpeak & Seas, PLLC (57) ABSTRACT

A scanning optical unit is provided which can prevent flare reflection of a laser beam at an end portion of a reflecting mirror which is provided outside an exposure region and which is for detecting a time of starting of exposure by the laser beam. In the scanning optical unit, given that a propagation distance from a transducer of an acousto-optic modulator (AOM) to a diffracted position of the laser beam passing through an acousto-optic modulating medium is L, a propagation speed of ultrasonic waves within the acousto-optic modulating medium is V, a main scanning speed of the laser beam is v, a distance from a position on a reflecting mirror at which the laser beam is reflected onto an SOS sensor to a recording medium side end portion of the reflecting mirror is l, and a focal length of an fθ lens is f, a relationship $L < l \cdot V / \{v \cdot (f-t)/f\}$ is established so as to prevent flare reflection of the laser beam.

18 Claims, 5 Drawing Sheets

SCANNING OPTICAL UNIT

BACKGROUND OF THE INVENTION

1. Field of the Invention

The present invention relates to an image forming device, and in particular, relates to a scanning optical unit provided in an image forming device, which scanning optical unit forms an image on a recording medium by scanning, in a main scanning direction, a laser beam which is diffracted by an acousto-optic modulating element (an acousto-optic modulator).

2. Description of the Related Art

An image exposure device, which scans a laser beam to write an image onto a photographic printing paper, is used in a digital laboratory system. The image exposure device is provided with light sources which emit laser beams of the colors of R, G, B. On the basis of color image data, the laser beams emitted from the light sources of the respective colors are modulated, and are illuminated onto a deflector such as a polygon mirror. The laser beam from the deflector is deflected in the main scanning direction and is illuminated onto a photographic printing paper.

The scanning optical unit provided at the image exposure device is provided with a light source unit comprising LDs of the colors of R, G, B, a collimator lens for condensing light, an acousto-optic modulator (AOM), an fθ lens, a cylindrical lens, and the like. The laser beams of R, G, B illuminated from the light source unit are illuminated onto a predetermined point of the polygon mirror, and main scanning is carried out by the laser beam reflected at the polygon mirror being illuminated onto a photographic printing paper.

In a scanning optical unit structured in this manner, the illuminated position of the laser beam is detected by a sensor, and the time at which the main scan starts is determined. The laser beam transmitted through the AOM is diffracted in accordance with the determined time at which the main scan starts.

The sensor that detects the laser beam may be structured so as to receive light which is the laser beam which has been reflected by the polygon mirror and further reflected by a reflecting mirror (Refer to Japanese Patent Application Laid-Open (JP-A) No. 6-202016).

When the laser beam is illuminated onto a peripheral edge portion of this reflecting mirror, flare reflection may occur, and the photographic printing paper may be needlessly exposed due to the flare-reflected laser beam. When the photographic printing paper is needlessly exposed by such flare reflection, the quality of the finish of the recorded image deteriorates.

Attempts have been made to prevent flare reflection in a main scanning optical unit by changing the intensity of light or the direction of diffraction of the light diffracted by the AOM which detects the laser beam by a sensor, such that the laser beam is not illuminated onto a peripheral portion of the reflecting mirror.

However, in the AOM, the laser beam passing through the acousto-optic modulating medium is diffracted by ultrasonic waves which are generated in the acousto-optic modulating medium by the transducer. Therefore, there is a time difference between the time when the ultrasonic waves are generated by the transducer and the time the laser beam is diffracted.

As a result, during the period of time from after the laser beam is detected by the sensor until the AOM is operated, the laser beam may reach a peripheral portion of the reflecting mirror, and flare reflection cannot always be reliably prevented.

SUMMARY OF THE INVENTION

In view of the aforementioned, an object of the present invention is to provide a scanning optical unit in which, by reliably preventing a laser beam from being illuminated onto a peripheral edge portion of a reflecting mirror, deterioration in the finished quality of an image formed on a recording medium such as a recording material due to the laser beam being flare-reflected at the peripheral edge portion of the reflecting mirror can reliably be prevented.

In order to achieve this object, a first aspect of the present invention is a scanning optical unit comprising: an acousto-optic modulating element including an acousto-optic modulating medium and a transducer which generates ultrasonic waves, and when a laser beam emitted from a laser light source passes through the acousto-optic modulating medium, the acousto-optic modulating element diffracts the laser beam by ultrasonic waves inputted by the transducer; main scanning/deflecting means for deflecting, in a main scanning direction of a recording medium, the laser beam which was diffracted by the acousto-optic modulating element; a reflecting mirror which is provided outside of an exposure region of the recording medium, and reflects the laser beam from the main scanning/deflecting means; and a sensor for determining a main scanning start position by receiving the laser beam reflected by the reflecting mirror, wherein a predetermined region of the recording medium is exposed by the laser beam deflected in a main scanning direction, and a distance, to the transducer from an illuminated position of the laser beam which is a diffracted position of the laser beam within the acousto-optic modulating medium, is set on the basis of a reflected position on the reflecting mirror of the laser beam received by the sensor with respect to a recording medium side end portion of the reflecting mirror, a main scanning speed of the laser beam, and a propagation speed of ultrasonic waves within the acousto-optic modulating medium.

In accordance with the first aspect of the invention, the distance between the transducer and the diffracted position of the laser beam within the acousto-optic modulating medium which diffracts the laser beam, is set on the basis of the propagation speed of ultrasonic waves within the acousto-optic modulating medium, the reflected position of the laser beam detected by the sensor for determining the main scanning start position, and the main scanning speed of the laser beam.

For example, the diffracted position of the laser beam may be set such that the laser beam moving on the reflecting mirror in the main scanning direction does not reach the recording medium side end portion of the reflecting mirror up to the time the diffraction of the laser beam stops, by the transducer being turned off on the basis of the results of detection of the sensor.

In this way, when the laser beam reaches the recording medium side end portion of the reflecting mirror, the laser beam is not illuminated onto the reflecting mirror. Flare reflection caused by the laser beam being illuminated onto the end portion of the reflecting mirror is reliably prevented, and the image formed on the recording medium is not spoiled due to flare reflection.

A second aspect of the present invention is a scanning optical unit comprising: an acousto-optic modulating element including an acousto-optic modulating medium and a transducer which generates ultrasonic waves, and when a laser beam emitted from a laser light source passes through the acousto-optic modulating medium, the acousto-optic modulating element modulates an intensity of the laser beam by ultrasonic waves inputted by the transducer; main scanning/deflecting means for deflecting, in a main scanning direction of a recording medium, the laser beam whose intensity was modulated by the acousto-optic modulating element; an optical system including an fθ lens; a reflecting mirror which is provided outside of an exposure region of the recording medium, and reflects the laser beam from the main scanning/deflecting means; and a scanning optical system including a sensor for determining a main scanning start position by receiving the laser beam reflected at a predetermined position of the reflecting mirror, wherein the recording medium is scanned and exposed by said main scanning/deflecting means and said optical system including the fθ lens, and given that a focal length of the fθ lens is f, the main scanning speed which is the speed at which the laser beam moves on the recording medium is v, the distance between the reflecting mirror and an exposure surface of the recording medium is t, a distance from a reflection position on the reflecting mirror of the laser beam detected by the sensor to a recording medium side end portion of the reflecting mirror is l, and a propagation speed of ultrasonic waves through the acousto-optic modulating medium is V, adjustment is carried out such that a distance L from an intensity modulation position within the acousto-optic modulating medium to the transducer is $L<l\cdot V/\{v\cdot(f-t)/f\}$.

In accordance with the second aspect of the present invention, only the propagation speed of the ultrasonic waves within the acousto-optic modulating medium and the main scanning speed matter, and the speed of the laser beam can be ignored. Therefore, the reflected position of the laser beam on the reflecting mirror is set such that the propagation time (L/V) required for the ultrasonic waves generated at the transducer to travel from the transducer to the diffracted position within the acousto-optic modulating medium at which the ultrasonic waves diffract the laser beam toward the reflecting mirror, is shorter than the scanning time $l\cdot f/\{v\cdot(f-t)\}$ required for the laser beam to be scanned from the reflected position on the reflecting mirror at which the laser beam is detected by the sensor to the recording medium side end portion of the reflecting mirror.

Namely, $l\cdot f/\{v\cdot(f-t)\}>(L/V)$. Thus, when diffraction or emission of the laser beam is stopped on the basis of the results of detection by the sensor, the illuminated position of the laser beam has not reached the recording medium side end portion of the reflecting mirror. Therefore, at this point in time, the illumination of the laser beam onto the reflecting mirror is stopped, and flare reflection caused by the laser beam being illuminated onto the end portion of the reflecting mirror is reliably prevented.

In a third aspect of the present invention, when determining the illuminated position of the laser beam onto the acousto-optic modulating medium, the reflected position on the reflecting mirror may be adjusted, and in this case, it is preferable that $l>(L/V)\cdot\{v\cdot(f-t)/f\}$.

A fourth aspect of the present invention is a scanning optical unit comprising: an acousto-optic modulating element including an acousto-optic modulating medium and a transducer which generates ultrasonic waves, and when a laser beam emitted from a laser light source passes through the acousto-optic modulating medium, the acousto-optic modulating element modulates an intensity of the laser beam by ultrasonic waves inputted by the transducer; main scanning/deflecting means for deflecting, in a main scanning direction of a recording medium, the laser beam whose intensity was modulated by the acousto-optic modulating element; an optical system including an fθ lens; a reflecting mirror which is provided outside of an exposure region of the recording medium, and reflects the laser beam from the main scanning/deflecting means; and a scanning optical system including a sensor for determining a main scanning start position by receiving the laser beam reflected at a predetermined position of the reflecting mirror, wherein the recording medium is scanned and exposed by said main scanning/deflecting means and said optical system including the fθ lens, and given that a focal length of the fθ lens is f, the main scanning speed which is the speed at which the laser beam moves on the recording medium is v, the distance between the reflecting mirror and an exposure surface of the recording medium is t, a distance from a reflection position on the reflecting mirror of the laser beam detected by the sensor to a recording medium side end portion of the reflecting mirror is l, a period of time from a time the laser beam reflected by the reflecting mirror is incident on the sensor to a time the acousto-optic modulating element is operated is τ, and a propagation speed of ultrasonic waves through the acousto-optic modulating medium at a time the acousto-optic modulating element is operated is V, adjustment is carried out such that a distance L from an intensity modulation position within the acousto-optic modulating medium to the transducer is $L<V\cdot[l\cdot f/\{v\cdot(f-t)\}-\tau]$.

In accordance with the fourth aspect, the distance to the transducer from the laser beam diffraction position within the acousto-optical modulating medium which diffracts the laser beam is set in consideration of the period of time τ from the time the sensor detects the laser beam to the time the transducer is operated.

Generally, when the sensor detects the laser beam, a signal expressing that the laser beam has been detected (i.e., an SOS signal) is outputted, and the transducer is operated on the basis of this signal. The detection and outputting of this signal are carried out synchronously with a clock signal within the circuit. Accordingly, the laser beam is also scanned during the period of time from the time the sensor receives the laser beam to the time the transducer is operated. Therefore, this period of time is a delay time. Thus, it is preferable that $L<l\cdot V/\{v\cdot(f-t)/f\}-V\cdot\tau$, in other words, that $L<V\cdot[l\cdot f/\{v\cdot(f-t)\}-\tau]$.

In this way, flare reflection of the laser beam at the reflecting mirror can be prevented more reliably.

DESCRIPTION OF THE PREFERRED EMBODIMENTS

Figure 1:
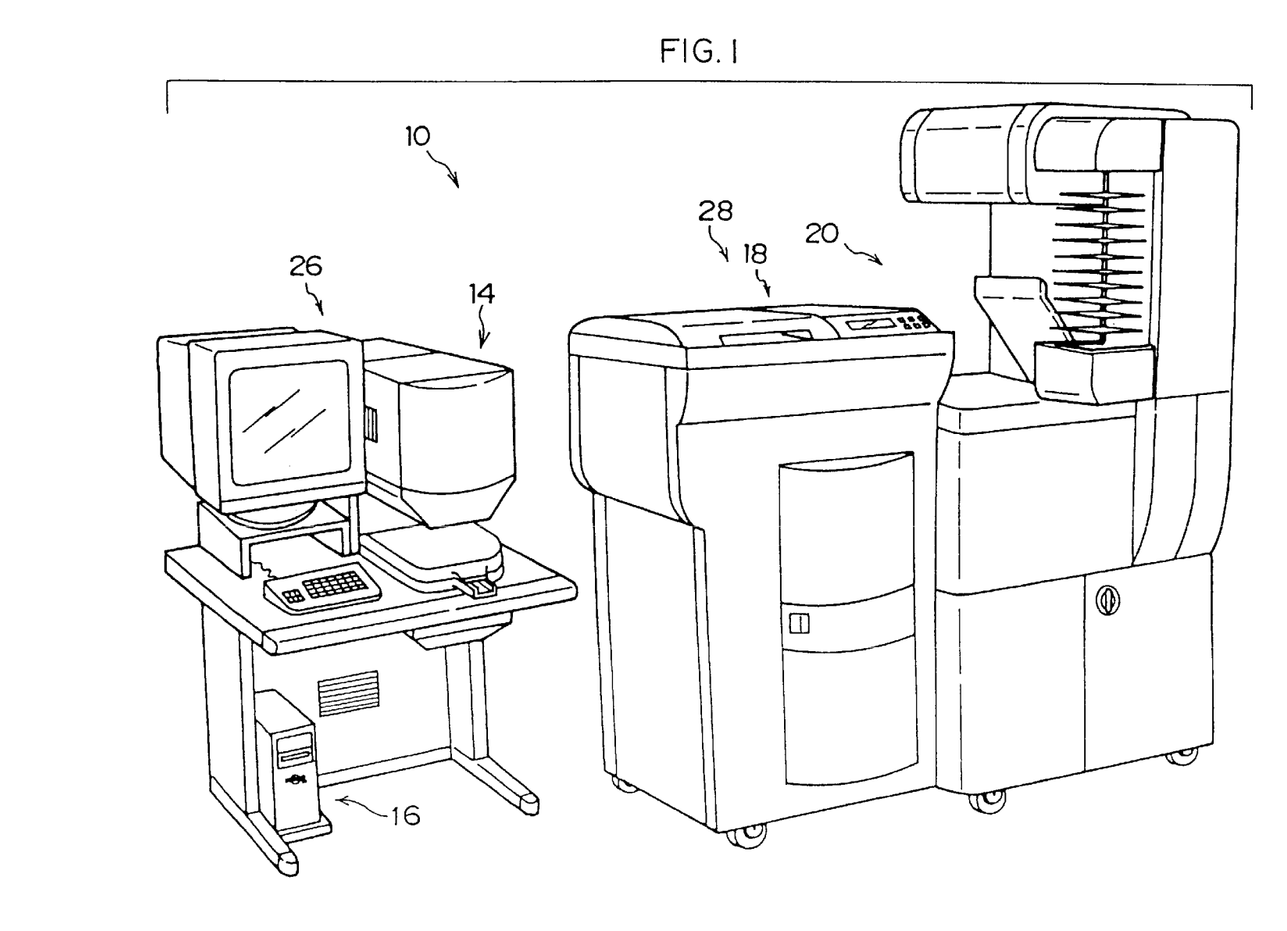
FIG. 1 is a schematic structural view illustrating the exterior of a digital laboratory system relating to an embodiment of the present invention.
Figure 2:
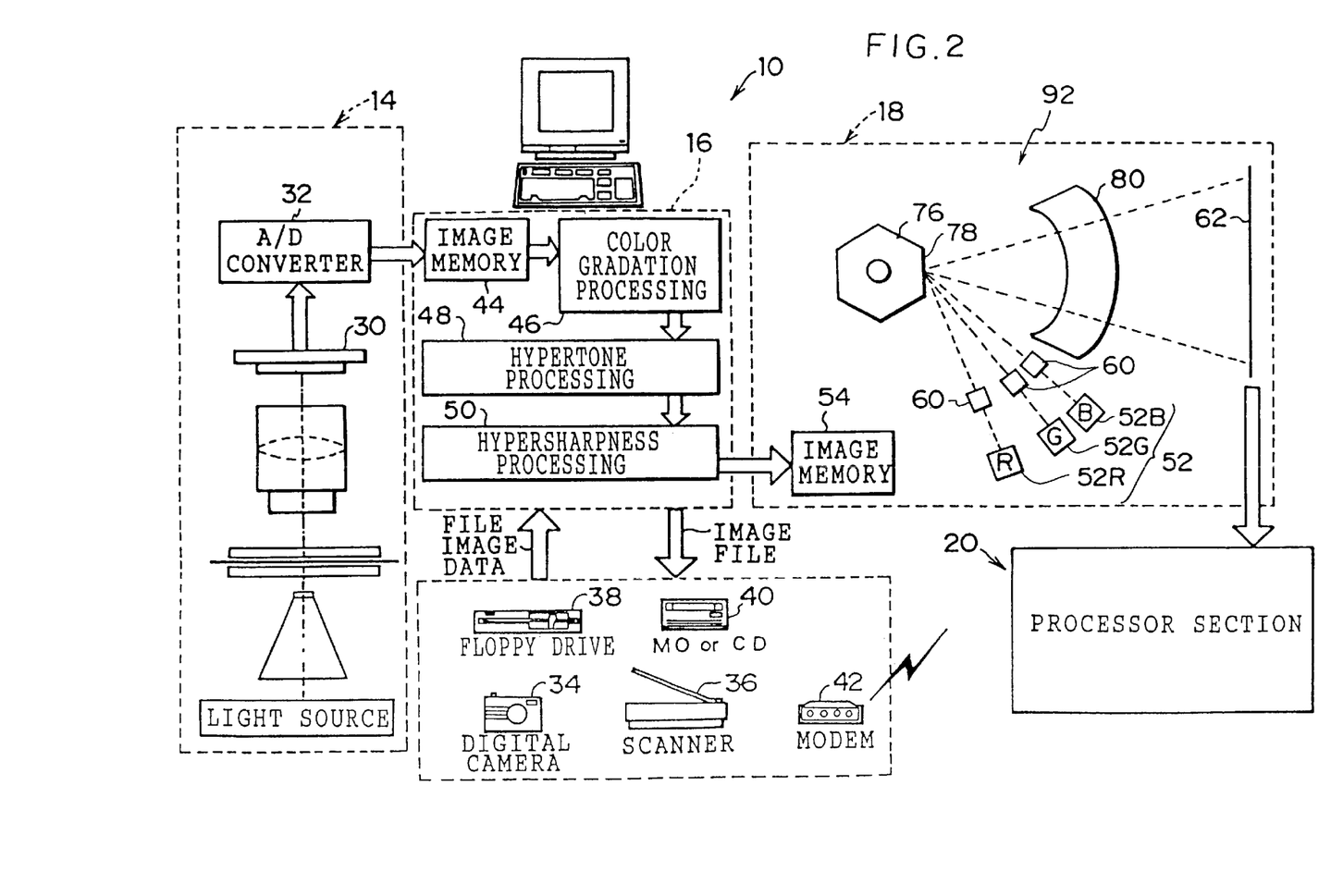
FIG. 2 is a block view of main portions illustrating the schematic structure of the digital laboratory system of FIG. 1.

FIGS. 1 and 2 illustrate a schematic structure of a digital laboratory system 10 relating to a preferred embodiment of the present invention.

As illustrated in FIG. 1, the digital laboratory system 10 includes a linear CCD scanner 14, an image processing section 16, a laser printer section 18, and a processor section 20. The linear CCD scanner 14 and the image processing section 16 are formed integrally as an input section 26, and the laser printer section 18 and the processor section 20 are formed integrally as an output section 28.

As illustrated in FIG. 2, the linear CCD scanner 14 is provided with a linear CCD 30. The linear CCD 30 reads frame images recorded on a photographic film F such as a negative film or a reversal film. Frame images of, for example, the following types of photographic films F can be read: 135 size photographic films, 110 size photographic films, photographic films on which a transparent magnetic layer is formed (240 size photographic films, known as APS films), and 120 size and 220 size (brownie size) photographic films.

The linear CCD scanner 14 reads, by the linear CCD 30, a frame image which is the subject of reading, subjects the data obtained by reading to A/D conversion at an A/D converter 32, and outputs the converted image data to the image processing section 16.

The image processing section 16 is structured such that image data (scan image data) outputted from the linear CCD scanner 14 is inputted to the image processing section 16. In addition, the following types of image data (file image data) can also be inputted to the image processing section 16 from the exterior: image data obtained by photographing by a digital camera 34 or the like; image data obtained by reading an original (e.g., a reflection original) by a scanner 36 (a flatbed-type scanner); image data generated by another computer and read from a floppy disk drive 38, or an MO drive or CD drive 40; image data received by communication via a modem 42; or the like.

In the image processing section 16, the inputted image data is stored in an image memory 44, and is subjected to image processings, such as various types of correction, at a color gradation processing section 46, a hypertone processing section 48, a hypersharpness processing section 50, and the like. The image data which has been subjected to image processing is outputted to the laser printer section 18 as image data for recording. Alternatively, the image processing section 16 may output the image data, which has been subjected to image processing, as an image file by recording the image data onto a storage medium such as an FD, MO, or CD, transmitting the image data to another information processing device via a telecommunications line, or the like.

The laser printer section 18 is equipped with R, G, B laser light sources 52R, 52G, 52B (hereinafter "laser source 52" when collectively referred to). The laser beam emitted from the laser light source 52 is modulated in accordance with the image data for recording which was inputted from the image processing section 16, and scan-exposes a photographic printing paper 62. In this way, an image corresponding to the image data is recorded on the photographic printing paper 62.

Further, in the processor section 20, the photographic printing paper 62, on which the image was recorded in the laser printer section 18, is subjected to color development processing, bleaching fixing processing, washing processing, and drying processing. In this way, the image is formed on the photographic printing paper 62, and a photographic print corresponding to the image data is obtained.

Figure 3:
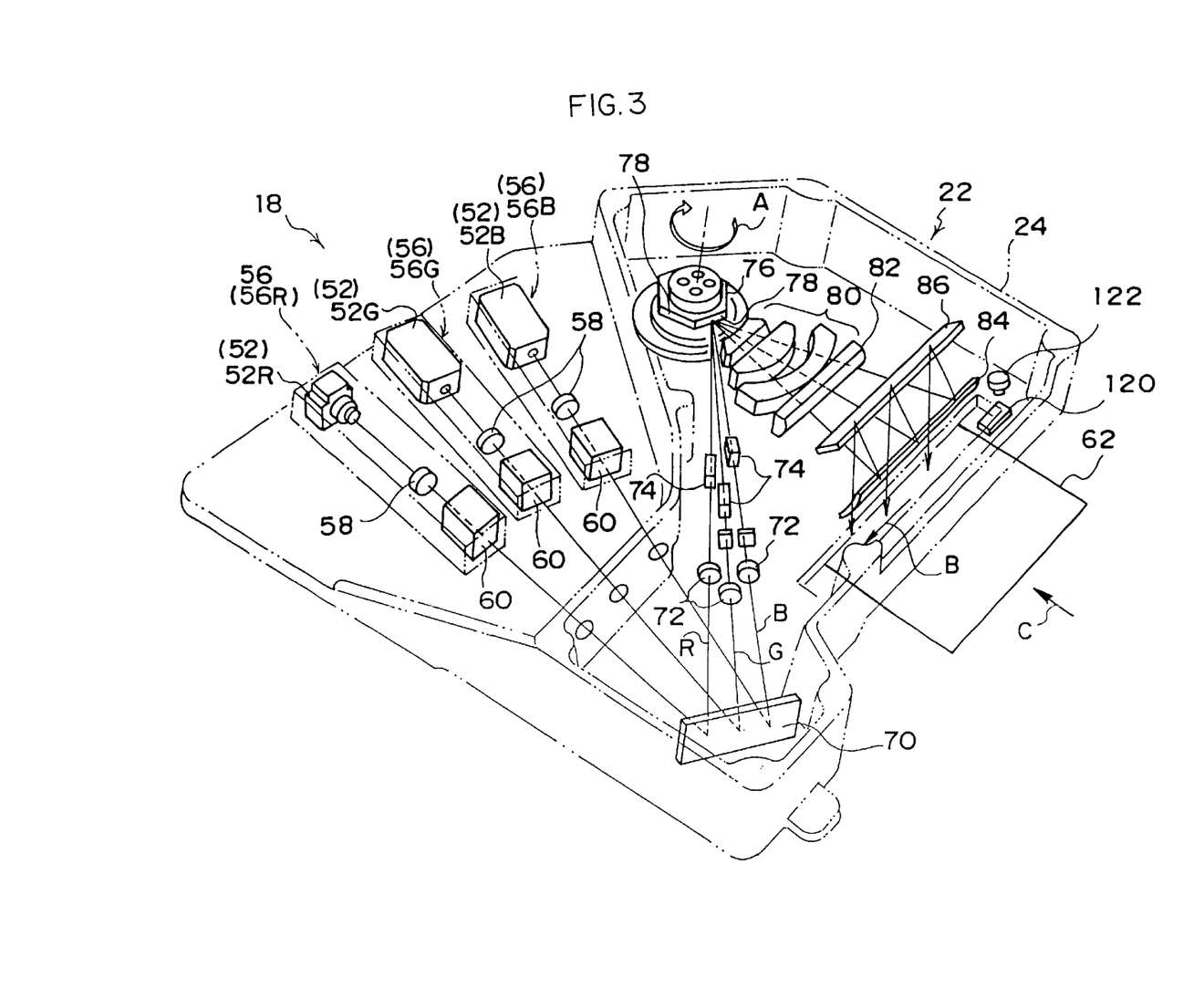
FIG. 3 is a perspective view of main portions illustrating the schematic structure of a general main scanning optical unit.

FIG. 3 illustrates a main scanning optical unit 22 which is provided at the laser printer section 18 as a laser beam scanning optical unit. Light source units 56R, 56G, 56B, which are provided with the laser light sources 52R, 52G, 52B which emit the R, G, B laser beams, are provided in a casing 24 at the main scanning optical unit 22. (Hereinafter, the light source units 56R, 56G, 56B may be referred to collectively as the "light source unit 56".)

The laser light source 52R is provided with a semiconductor laser (LD) which emits a laser beam of an R wavelength (e.g., 680 nm). The laser light sources 52G, 52B are provided with an LD and a wavelength converting element (SHG) which converts the laser beam emitted from the LD to a laser beam of ½ the wavelength. The oscillating wavelengths of these LDs are determined such that a laser beam of a G wavelength (e.g., 532 nm) and a laser beam of a B wavelength (e.g., 475 nm) are emitted from the SHGs.

A collimator lens 58 and an acousto-optic modulator (hereinafter, "AOM") 60 are provided in that order at the laser beam emitting side of each of the laser light sources 52R, 52G, 52B.

Figure 5A:
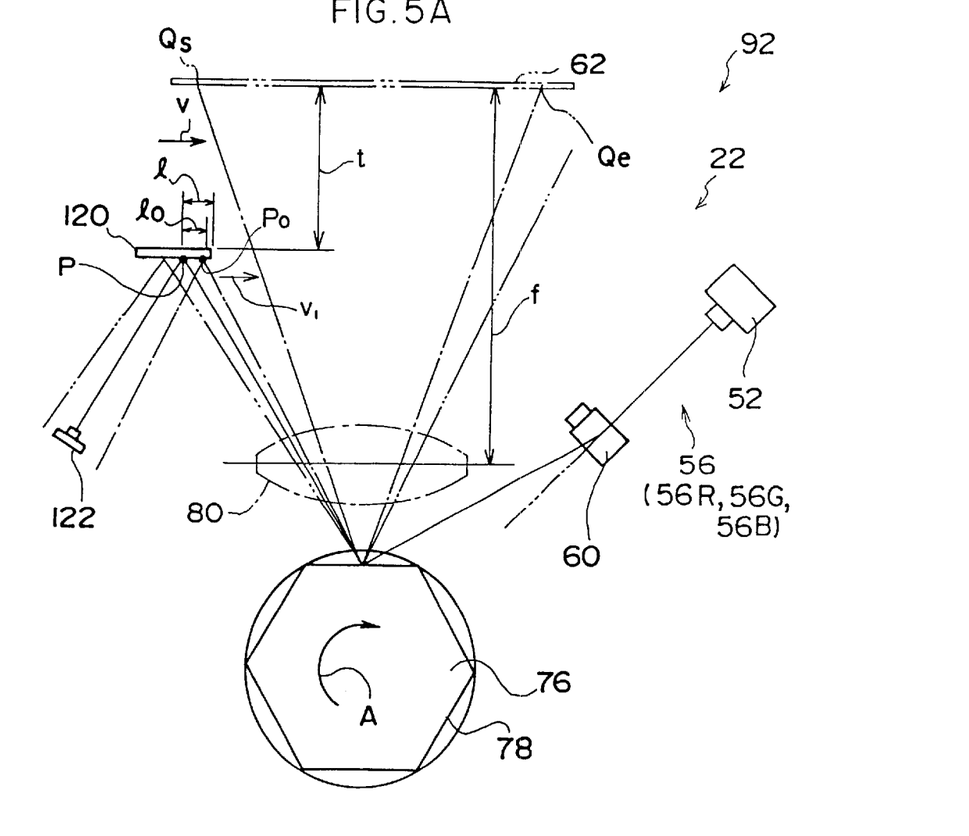
FIG. 5A is a structural view illustrating the schematic structure of a main scanning optical unit to which the present invention is applied.
Figure 5B:
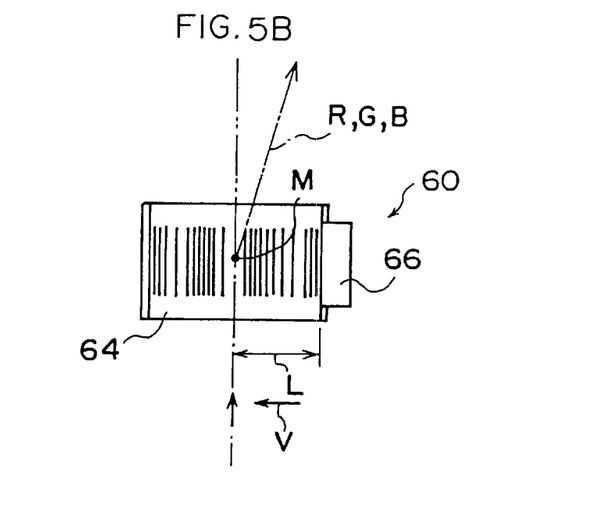
FIG. 5B is a structural view illustrating the schematic structure of an AOM used in the main scanning optical unit of FIG. 5A.

As illustrated in FIG. 5B, the AOM 60 is formed by an acousto-optic modulating medium 64 through which an incident laser beam passes, and a transducer 66 which generates ultrasonic waves. At the AOM 60, ultrasonic waves generated by inputting a predetermined high frequency signal to the transducer 66 are propagated within the acousto-optic modulating medium 64. The laser beams which are emitted from the laser light sources 52R, 52G, 52B and pass through collimator lenses 58 are diffracted by the ultrasonic waves when they pass through the AOMs 60.

As illustrated in FIG. 3, a plane mirror 70, beam expanders 72, cylindrical lenses 74, and a polygon mirror (PLG) 76 serving as a main scanning/deflecting means are provided in that order within the casing 24 of the main scanning optical unit 22. When the laser beams which exit from the AOMs 60 are reflected at the plane mirror 70, the laser beams are made into parallel light by the beam expanders 72, and thereafter, are focused linearly by the cylindrical lenses 74 and are illuminated onto substantially the same position on a deflecting/reflecting surface 78 of the polygon mirror 76. At this time, by rotating the polygon mirror 76 at high speed, the laser beams are reflected while being deflected in the main scanning direction, and are scanned in the main scanning direction at a predetermined scanning speed.

When fixed lasers are used as the LDs which emit the G and B laser beams, it is preferable to provide an ND filter on the optical path of the laser beam between the beam expander 72 and the cylindrical lens 74, so that the laser beam can be deflected slightly (e.g., about 0.5°) and oscillation of the LD due to the reflected laser beam returning to the LD can be prevented. Or, by using a wedge-shaped ND filter, the angle of deflection of the laser beam can be adjusted.

An fθ lens 80 which corrects the scanning speed on the exposure surface, a cylindrical lens 82 for compensating for pyramidal angle error and having a power lens in the subscanning direction, and a cylindrical mirror 84 are provided in that order at the laser beam reflecting side of the polygon mirror 76. Further, a bend-back mirror 86 is disposed at the laser beam reflecting side of the cylindrical mirror 84.

The laser beam, which is reflected while being deflected in the main scanning direction by the polygon mirror 76, passes through the fθ lens 80 and the cylindrical lens 82 in that order, and thereafter, is reflected toward the bend-back mirror 86 by the cylindrical mirror 84, and is reflected toward the photographic printing paper 62 by the bend-back mirror 86. In this way, the laser beam is illuminated while being main scanned onto the photographic printing paper 62.

In FIG. 3, the direction of rotation of the polygon mirror 76 is denoted by arrow A, the main scanning direction of the laser beam is denoted by the arrow B, and the subscanning direction of the photographic printing paper 62 is denoted by the arrow C. Further, it is possible to omit the bend-back mirror 86, and for the laser beam to be reflected substantially vertically downward by the cylindrical mirror 84 to irradiate the photographic printing paper 62.

Figure 4:
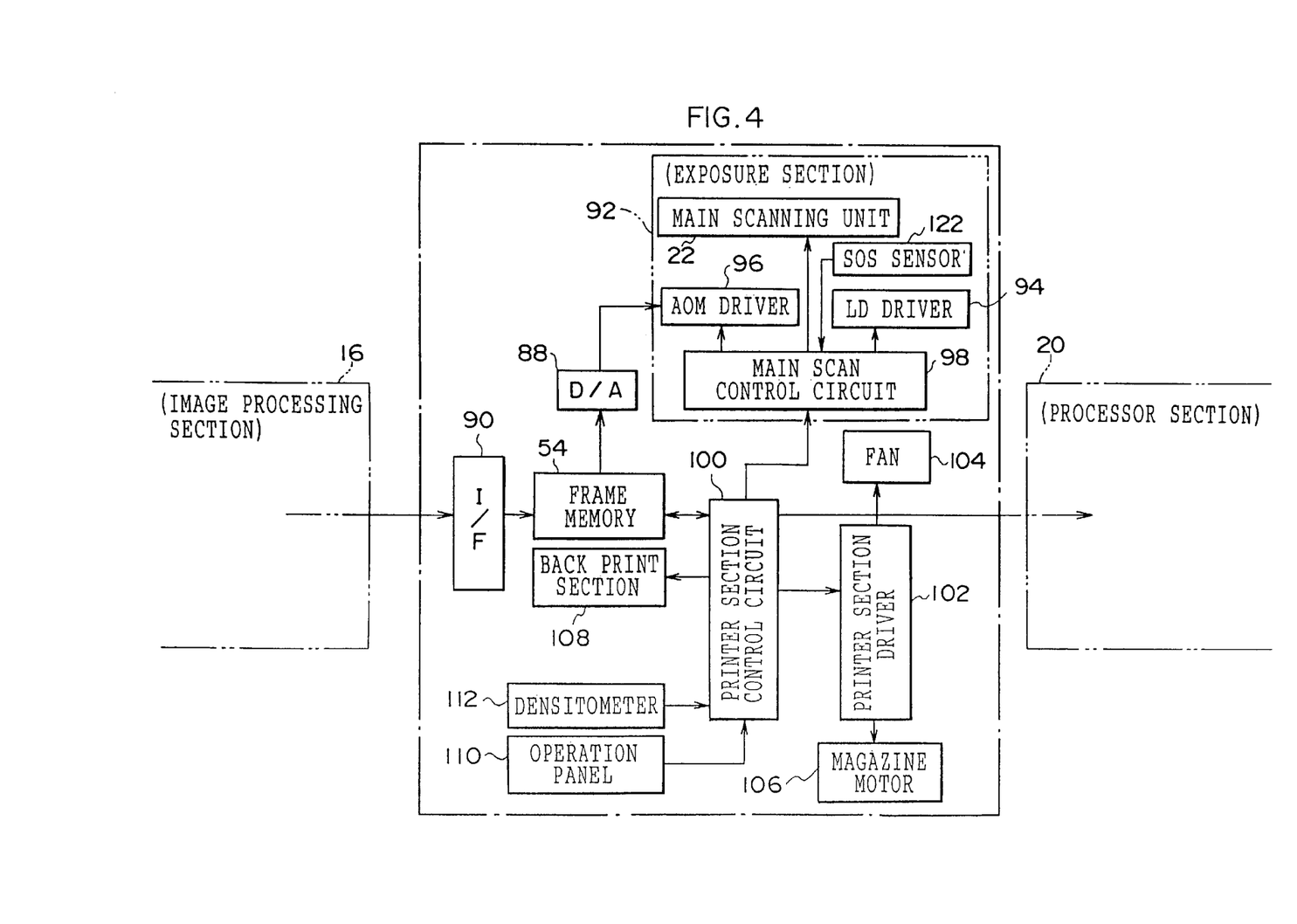
FIG. 4 is a block view illustrating a schematic structure of a laser printer section at which the main scanning optical unit is provided.

FIG. 4 illustrates the schematic structure of the electrical system of the laser printer section 18. The laser printer section 18 is provided with a frame memory 54 which stores image data for recording. Image data inputted from the image processing section 16 via an I/F circuit 90 (i.e., data expressing the R, G, B densities of each pixel of the image to be recorded on the photographic printing paper 62) is temporarily stored in the frame memory 54. The image data stored in the frame memory 54 is outputted, via a D/A converter 88, to an exposure section 92 at which the main scanning optical unit 22 is provided.

The exposure section 92 is provided with the main scanning optical unit 22 at which the polygon mirror 76 is provided, an LD driver 94 which drives each of the LDs of the laser light sources 52 of the respective colors, an AOM driver 96 which drives the AOMs 60, and a main scanning control circuit 98 which controls these components. Further, the main scanning control circuit 98 is connected to a printer section control circuit 100 which is provided with a microcomputer (not shown). On the basis of control signals from the printer section control circuit 100, the main scanning control circuit 98 controls the laser light sources 52, the AOMs 60, a motor (not shown) for driving the polygon mirror 76 provided at the main scanning unit 22, and the like, so as to main scan the laser beam.

At this time, at the AOMs 60 corresponding to the respective colors of R, G, B, high frequency signals corresponding to the image data are inputted to the transducers 66 from the AOM driver 96. In this way, at each AOM 60, the transducer 66 causes ultrasonic waves to propagate within the acousto-optic modulating medium 64 in accordance with the high frequency signals, diffraction is generated in the laser beam illuminated at the acousto-optic modulating medium 64, and the laser beam is emitted as diffracted light at an intensity corresponding to the amplitude of the high frequency signals. Namely, laser beams diffracted in accordance with the image data are emitted from the AOMs 60, and an image corresponding to the image data is formed by the photographic printing paper 62 being exposed by these laser beams.

A fan motor 104 which applies pressure to the interior of the casing 24 is connected to the printer section control circuit 100 via a printer section driver 102. A magazine motor 106 for pulling out the photographic printing paper 62 from a magazine loaded in the laser printer section 18 is also connected to the printer section control circuit 100 via the printer section driver 102. Also connected to the printer section control circuit 100 are a back print section 108 which prints characters and the like on the reverse surface of the photographic printing paper 62, an operation panel 110 which an operator uses to issue various types of print commands, and the like. The printer section control circuit 100 controls the operations of these elements in conformance with the operation of the exposure section 92 so as to subject the photographic printing paper 62 to exposure processing.

A densitometer 112, which measures the image density of the photographic printing paper 62 for which developing processing at the processor section 20 has been completed, and a processor section control circuit (not shown), which is provided at the processor section 20, are connected to the printer section control circuit 100. The operations of the laser printer section 18 and the processor section 20 are synchronized such that the photographic printing paper 62 on which an image has been formed at the laser printer section 18 can thereafter be processed at the processor section 20.

As illustrated in FIG. 3, a reflecting mirror 120 is disposed in the main scanning optical unit 22 between the bend-back mirror 86 and the conveying path of the photographic printing paper 62. In the present embodiment, the reflecting mirror 120 is provided between the bend-back mirror 86 and the conveying path of the photographic printing paper 62, but in the present invention, the reflecting mirror 120 may be provided at any position between the polygon mirror 76 (which is the main scanning/deflecting means) and the photographic printing paper 62 (which is the recording medium).

As illustrated in FIG. 5A, the reflecting mirror 120 is disposed at one end side in the main scanning direction of the laser beam. When the laser beam which is being main scanned is directed toward a region outside of the image recording region, the laser beam is illuminated onto the reflecting mirror 120, and thereafter, is illuminated onto the image recording region.

Namely, the laser beam main scanning region (the region illustrated by the two-dot chain lines in FIG. 5A) is wider than the image recording region, and the reflecting mirror 120 is disposed within the main scanning region but outside of the image recording region. In this way, after the laser beam which is scanned in the main scanning direction is illuminated onto the reflecting mirror 120, the laser beam is illuminated onto the image recording region.

Further, an SOS sensor 122 is provided in the main scanning optical unit 22 so as to oppose the reflecting mirror 120. The SOS sensor 122 receives the laser beam which is reflected at a predetermined position P of the reflecting mirror 120. Namely, when the laser beam is illuminated onto the predetermined position P along the main scanning direction, the laser beam is detected by the SOS sensor 122.

As illustrated in FIG. 4, the SOS sensor 122 is connected to the main scanning control circuit 98. From the results of detection by the SOS sensor 122, the main scanning control circuit 98 determines the time at which the laser beam will reach the image recording region, and controls the AOMs 60 on the basis of the results of determination.

In this way, as illustrated in FIG. 5A, the laser beam, which is modulated in accordance with the image data and polarized by the polygon mirror 76 and the fθ lens 80, is illuminated in the image recording region of the photographic printing paper 62 which is from a main scanning starting position Qs to a main scanning ending position Qe.

When the laser beam is illuminated onto the photographic printing paper 62 side end portion of the reflecting mirror 120, there is the possibility that a significant amount of flare reflection of the laser beam will occur and the photographic printing paper 62 will be exposed. In order to prevent such flare reflection of the laser beam at the end portion of the reflecting mirror 120, at the main scanning control circuit 98 of the exposure section 92, when the laser beam is detected by the SOS sensor 122, the diffraction of the laser beams at the AOMs 60 is stopped, and when the laser beam reaches the recording start position Qs, the AOMs 60 are turned on and exposure of the photographic printing paper 62 is carried out.

As illustrated in FIG. 5B, at the AOM 60, the ultrasonic waves generated by the transducer 66 are propagated within the acousto-optic modulating medium 64, and when the ultrasonic waves pass through the illuminated position of the laser beam, the laser beam is diffracted. Thus, for example, from the time the AOM 60 is turned off to the time that diffraction of the laser beam actually stops, there is a time lag (delay) which corresponds to the propagating speed V of the ultrasonic waves within the acousto-optic modulating medium 64 and the propagating distance L from the transducer 66 to the laser beam diffraction position M. This time lag $T_0$ is $T_0 = L/V$.

At this time, because the polygon mirror 76 is always rotating, the illuminated position of the laser beam moves in the main scanning direction during the time lag. Thus, at the exposure section 92, the illuminated position of the laser beam on the AOM 60, i.e., the diffraction position M of the laser beam within the acousto-optic modulating medium 64, is adjusted such that the illuminated position of the laser beam on the reflecting mirror 120 is prevented from reaching the end portion of the reflecting mirror 120 during the time lag.

As illustrated in FIG. 5A, the laser beam emitted from the AOM 60 is reflected at the polygon mirror 76, passes through the fθ lens 80, and is illuminated onto the reflecting mirror 120 or the photographic printing paper 62. At this time, the scanning speed $v_1$ of the laser beam on the reflecting mirror 120 is expressed as follows:

$$v_1 = v \cdot (f-t)/f$$

wherein the main scanning speed of the laser beam on the photographic printing paper 62 is v, the focal length of the fθ lens 80 is f, and the distance between the reflecting mirror 120 and an exposure surface of the photographic printing paper 62 is t.

Accordingly, the moving distance $l_0$ of the light beam on the reflecting mirror 120 during the time lag $T_0$ is:

$$l_0 = v_1 \cdot T_0 = (L/V) \cdot \{v \cdot (f-t)/f\}.$$

In order to prevent flare reflection at the reflecting mirror 120, the moving distance $l_0$ is made shorter than the distance l along the main scanning direction from the reflecting position P of the reflecting mirror 120 to the photographic printing paper 62 side end portion of the reflecting mirror 120. Namely, $l_0 < l$. Thus, the propagation distance L for preventing flare reflection is such that $$L < l \cdot V/\{v \cdot (f-t)/f\}.$$

Adjustment is carried out at the exposure section 92 such that the laser beam is illuminated to the diffraction position M which is at the propagation distance L.

In this way, when the laser beam is detected by the SOS sensor 122, after the illuminated position of the laser beam moves on the reflecting mirror 120 by a distance $l_o$ ($l_o < l$) from the reflecting position P, i.e., before the illuminated position of the laser beam reaches the end portion of the reflecting mirror 120, illumination is temporarily stopped.

Operation of the present embodiment will be described hereinafter.

In the digital laboratory system 10 to which the present embodiment is applied, when an image recorded on a photographic film or the like is read as image data by the color CCD scanner 14, the image data is outputted to the image processing section 16. At the image processing section 16, the image data read by the color CCD scanner 14 is subjected to predetermined image processings, and is outputted to the laser printer section 18 as image data for recording, which image data is to be recorded onto the photographic printing paper 62.

At the laser printer section 18, after the image data inputted from the image processing section 16 is stored in the frame memory 54, the exposure section 92 and the like are controlled on the basis of the image data stored in the frame memory 54. The photographic printing paper 62 is scanned and exposed in accordance with the image data, and an image corresponding to the image data is formed on the photographic printing paper 62.

The photographic printing paper 62 on which an image has been exposed at the printer section 18 is conveyed from the laser printer section 18 to the processor section 20 where developing processing is carried out. In this way, a photographic print which is based on the image read by the color CCD scanner 14 is obtained.

At the main scanning optical unit 22 which is provided at the laser printer section 18, due to signals corresponding to the image data being inputted to the AOMs 60 (the AOM driver 96) of the light source unit 56, the R, G, B laser beams emitted from the laser light source 52 are modulated on the basis of the image data (density data) of the respective colors, and are emitted toward the plane mirror 70.

The laser beams of the respective colors emitted toward the plane mirror 70 are reflected by the plane mirror 70 toward the polygon mirror 76, and, by the rotating polygon mirror 76, are reflected while being scanned in the main scanning direction. Thereafter, after the laser beam passes through the fθ lens 80 and the like, the laser beam is reflected toward the photographic printing paper 62 by the cylindrical mirror 84 and the bend-back mirror 86. In this way, the laser beam exposes the photographic printing paper 62 while being scanned.

At the exposure section 92 which carries out exposure, at the time the laser beam is main scanned, when the laser beam illuminated to and reflected by the reflecting mirror 120 is detected by the SOS sensor 122, the laser beam is modulated by the AOM 60 on the basis of the image data and on the basis of this detection timing. Namely, at the exposure section 92, when the laser beam is detected at the SOS sensor 122, the timing for starting the main scan onto the photographic printing paper 62 is set, and the laser beam is modulated on the basis of the results of setting.

At the exposure section 92, when the laser beam illuminated onto the reflecting position P of the reflecting mirror 120 is detected by the SOS sensor 122, the diffraction of the laser beam by the AOM 60 is temporarily stopped, and thereafter, when the laser beam reaches the recording starting position Qs, the illumination of the laser beam is started again. In this way, a fixed region of the photographic printing paper 62 from the recording starting position Qs to the recording ending position Qe is reliably exposed.

At the AOM 60, due to high frequency signals being inputted to the transducer 66, ultrasonic waves corresponding to the high frequency signals are generated. Due to these ultrasonic waves being propagated within the acousto-optic modulating medium 64, the laser beam illuminated to the acousto-optic modulating medium 64 is diffracted. Here, there is a time lag (delay) determined by the propagation speed V of the ultrasonic waves within the acousto-optic modulating medium 64 and the propagation distance L from the transducer 66 to the diffraction position M at which the laser beam is illuminated.

As a result, the laser beam is main scanned on the reflecting mirror 120 during the period of time (the time lag) from the time the laser beam is detected by the SOS sensor 122 to the time diffraction of the laser beam is actually stopped.

Generally, it is preferable that the propagation distance L, which is the distance from the diffraction position M of the laser beam at the AOM 60 to the transducer 66, is short. In the main scanning optical unit 22 to which the present embodiment is applied, the position at which the laser beam is illuminated onto the acousto-optic modulating medium 64 of the AOM 60 is adjusted so that the propagation distance L is $L<l\cdot V/\{v\cdot(f-t)/f\}$.

In this way, in a case in which there is, for example, a delay of time $T_o$ ($T_o=L/V$) due to the AOM 60, the illuminated position of the laser beam moves on the reflecting mirror 120 during this time $T_o$.

At this time, at the exposure section 92, the distance lo, over which the reflected position P (see FIG. 5A) of the laser beam moves on the reflecting mirror 120 during the time that diffraction of the laser beam by the AOM 60 is stopped, is $$l_o = T_o \cdot v_1 = (L/V) \cdot \{v\cdot(f-t)/f\}.$$

Further, as described above, adjustment is carried out so that $$L < l\cdot V/\{v\cdot(f-t)/f\},$$

and thus, $l_0 < l$.

Accordingly, before the laser beam reaches the photographic printing paper 62 side end portion of the reflecting mirror 120, the illumination of the laser beam is stopped temporarily. Thus, flare reflection due to the laser beam being illuminated onto the end portion of the reflecting mirror 120 is not caused.

For example, if an image having a resolution of 300 DPI (one pixel is 84.7 μm) is exposed and formed at a main scanning speed of v=2100 m/s (the exposure time for one pixel is 40 ns) by using an AOM 60 in which V=4260 m/s and an optical system in which f=300 mm and t=50 mm, given that l=2 mm and L=5 mm, the laser beam will reach the end portion of the reflecting mirror 120 before the laser beam is stopped.

In contrast, if an image having a resolution of 300 DPI (one pixel is 84.7 μm) is exposed and formed at a main scanning speed of v=1050 m/s (the exposure time for one pixel is 80 ns) by using an AOM 60 in which V=4260 m/s and an optical system in which f=250 mm and t=100 mm, given that l=2 mm and L=5 mm, flare reflection will not occur at the reflecting mirror 120.

In this way, at the exposure section 92, flare reflection of the laser beam does not occur at the end portion of the reflecting mirror 120. Thus, the image formed on the photographic printing paper 62 does not deteriorate due to the photographic printing paper 62 being unnecessarily exposed by the flare-reflected laser beam.

The structure of the present invention is not to be limited to the above-described embodiment.

In the present embodiment, the position at which the laser beam is incident on the AOM 60 is adjusted in order to prevent flare reflection from occurring at the end portion of the reflecting mirror. However, it is also possible to adjust the reflecting position P on the reflecting mirror 120 of the laser beam detected by the SOS sensor 122 such that the distance l along the main scanning direction from the reflecting position P to the photographic printing paper 62 side end portion of the reflecting mirror 120 is $l>(L/V)\cdot\{v\cdot(f-t)/f\}$.

Further, $v_1<v$. Thus, $$L<l\cdot V/v, \text{ or } l<L\cdot v/V.$$

In the present embodiment, a case has been described in which the distance L and the like are set on the basis of the time from the time the transducer 66 is operated. However, it is more preferable to consider the period of time from the time that the laser beam reflected by the reflecting mirror 120 is detected by the SOS sensor 122 to the time that the transducer 66 is operated.

Namely, as illustrated in FIG. 4, at the exposure section 92, the results of detection by the SOS sensor 122 are read by the main scanning control circuit 98, and it is judged that the SOS signal has been detected. Thereafter, the main scanning control circuit 98 outputs to the AOM driver 96 an image signal corresponding to the stopping of the laser beam, and the transducer 66 is thereby operated.

The main scanning control circuit 98 carries out various processings synchronously with a clock signal of a predetermined frequency. More specifically, the SOS signal from the SOS sensor 122 is read synchronously with the clock signal, and the image signal is outputted to the AOM driver 96 synchronously with the clock signal.

In this way, a time difference, which corresponds to the period of the clock signal, is generated from the time the SOS sensor 122 detects the laser beam to the time the transducer 66 operates. When the frequency of the clock signal is, for example, 5 MHz, the time difference will be 200 nsec or less because the period of the clock signal is 200 nsec.

The laser beam is being scanned during the period of time from the time the SOS sensor 122 detects the laser beam to the time the transducer 66 is operated. Therefore, this time difference is a delay time by which the stopping of the diffraction of the laser beam is delayed. Accordingly, given that this time difference is a delay time τ, it is preferable that $$L<l\cdot V/\{v\cdot(f-t)/f\}-V\cdot\tau,$$

in other words, that $$L<V\cdot[l\cdot f/\{v\cdot(f-t)\}-\tau].$$

In this way, the flare reflection of the laser beam at the reflecting mirror 120 can be prevented more reliably, and an image of high finished quality can be formed on the photographic printing paper 62.

Moreover, in the present embodiment, the reflecting mirror 120 which reflects the laser beam toward the SOS sensor 122 is provided between the bend-back mirror 86 and the photographic printing paper 62. However, the reflecting mirror 120 can be provided at any arbitrary position as long as the position of the reflecting mirror 120 is a position between the main scanning/deflecting means and the recording medium at which position the laser beam which is being main scanned can be detected by the SOS sensor 122, e.g., in a vicinity of the polygon mirror 76 or the like.

Further, in the present embodiment, description is given of a scanning optical unit which effects exposure by using laser beams of the respective colors of R, G, B. However, the scanning optical unit to which the present invention is applied may be a unit utilizing a laser beam of a single wavelength.

In the present embodiment, the scanning optical unit of the present invention is applied to the laser printer section 18 of the digital laboratory system 10 which exposes the photographic printing paper 62. However, the scanning optical unit of the present invention is not limited to the same, and may be applied to a scanning optical unit which forms an image on an arbitrary recording medium, such as a copier using a photosensitive drum as the recording medium or the like.

In accordance with the present invention, the position at which a laser beam is illuminated onto an acousto-optic modulating medium is set on the basis of the propagation speed of ultrasonic waves within the acousto-optic modulating medium, the main scanning speed of the laser beam, and the distance from the exposure region side end portion of the reflecting mirror to the predetermined reflecting position on the reflecting mirror. Therefore, flare reflection of the laser beam caused by the laser beam being illuminated onto an end portion of the reflecting mirror can be prevented.

In this way, the finish of the image formed on the recording medium does not deteriorate, and an image with a high-quality finish can be formed.

What is claimed is:

1. A scanning optical unit comprising:

an acousto-optic modulating element including an acousto-optic modulating medium and a transducer which generates ultrasonic waves, and when a laser beam emitted from a laser light source passes through the acousto-optic modulating medium, the acousto-optic modulating element diffracts the laser beam by ultrasonic waves inputted by the transducer;

main scanning/deflecting means for deflecting, in a main scanning direction of a recording medium, the laser beam which was diffracted by the acousto-optic modulating element;

a reflecting mirror which is provided outside of an exposure region of the recording medium, and reflects the laser beam from the main scanning/deflecting means; and a sensor for determining a main scanning start position by receiving the laser beam reflected by the reflecting mirror, wherein a predetermined region of the recording medium is exposed by the laser beam deflected in a main scanning direction, and a distance, to the transducer from an illuminated position of the laser beam which is a diffracted position of the laser beam within the acousto-optic modulating medium, is set on the basis of a reflected position on the reflecting mirror of the laser beam received by the sensor with respect to a recording medium side end portion of the reflecting mirror, a main scanning speed of the laser beam, and a propagation speed of ultrasonic waves within the acousto-optic modulating medium.

2. A scanning optical unit according to claim 1, further comprising:

an optical system containing an fθ lens, wherein given that a focal length of the fθ lens is f, the main scanning speed which is the speed at which the laser beam moves on the recording medium is v, the distance between the reflecting mirror and an exposure surface of the recording medium is t, a distance from a reflection position on the reflecting mirror of the laser beam detected by the sensor to a recording medium side end portion of the reflecting mirror is l, and a propagation speed of ultrasonic waves through the acousto-optic modulating medium at a time the acousto-optic modulating element is operated is V, a distance L from a diffraction position within the acousto-optic modulating medium to the transducer is $L < l \cdot V / \{v \cdot (f-t)/f\}$.

3. A scanning optical unit according to claim 2, wherein given that a period of time from a time the laser beam reflected by the reflecting mirror is incident on the sensor to a time the acousto-optic modulating element is operated is τ, $$L < V \cdot [l \cdot f / \{v \cdot (f-t)\} - \tau].$$

4. A scanning optical unit according to claim 3, wherein the scanning optical unit is connected to a control means, and when the sensor detects the laser beam, the control means temporarily stops the acousto-optic modulating element, and starts operation of the acousto-optic modulating element again at the time when the laser beam has reached a main scanning start position of the recording medium, so as to carry out exposure of the recording medium.

5. A scanning optical unit according to claim 4, wherein from the time the acousto-optic modulating element is stopped to the time diffraction of the laser beam is actually stopped, there is a time lag which corresponds to the propagation speed V and the distance L, and due to this time lag, after the acousto-optic modulating element is stopped, the illuminated position of the laser beam on the reflecting mirror moves in the main scanning direction on the reflecting mirror by a distance $l_0$ from the reflected position on the reflecting mirror of the laser beam received by the sensor, wherein $l_0 < l$.

6. A scanning optical unit comprising:

an acousto-optic modulating element including an acousto-optic modulating medium and a transducer which generates ultrasonic waves, and when a laser beam emitted from a laser light source passes through the acousto-optic modulating medium, the acousto-optic modulating element diffracts the laser beam by ultrasonic waves inputted by the transducer;

main scanning/deflecting means for deflecting, in a main scanning direction of a recording medium, the laser beam which was diffracted by the acousto-optic modulating element;

a reflecting mirror which is provided outside of an exposure region of the recording medium, and reflects the laser beam from the main scanning/deflecting means; and a sensor for determining a main scanning start position by receiving the laser beam reflected by the reflecting mirror, wherein a predetermined region of the recording medium is exposed by the laser beam deflected in a main scanning direction, and a distance, from a reflected position on the reflecting mirror of the laser beam received by the sensor to an exposure region side end portion of the reflecting mirror, is set on the basis of a distance to the transducer from an illuminated position of the laser beam which is a diffracted position of the laser beam within the acousto-optic modulating medium, a main scanning speed of the laser beam, and a propagation speed of ultrasonic waves within the acousto-optic modulating medium.

7. A scanning optical unit according to claim 6, further comprising:

an optical system containing an fθ lens, wherein given that a focal length of the fθ lens is f, the main scanning speed which is the speed at which the laser beam moves on the recording medium is v, the distance between the reflecting mirror and an exposure surface of the recording medium is t, a propagation speed of ultrasonic waves through the acousto-optic modulating medium at a time the acousto-optic modulating element is operated is V, and a distance from a diffraction position within the acousto-optic modulating medium to the transducer is L, a distance l from a reflection position on the reflecting mirror of the laser beam detected by the sensor to a recording medium side end portion of the reflecting mirror is $$l > (L/V) \cdot \{v \cdot (f-t)/f\}.$$

8. A scanning optical unit according to claim 7, wherein given that a period of time from a time the laser beam reflected by the reflecting mirror is incident on the sensor to a time the acousto-optic modulating element is operated is τ, $$l > \{(L/V) + \tau\} \cdot \{v \cdot (f-t)/f\}.$$

9. A scanning optical unit according to claim 8, wherein the scanning optical unit is connected to a control means, and when the sensor detects the laser beam, the control means temporarily stops the acousto-optic modulating element, and starts operation of the acousto-optic modulating element again at the time when the laser beam has reached a main scanning start position of the recording medium, so as to carry out exposure of the recording medium.

10. A scanning optical unit according to claim 9, wherein from the time the acousto-optic modulating element is stopped to the time diffraction of the laser beam is actually stopped, there is a time lag which corresponds to the propagation speed V and the distance L, and due to this time lag, after the acousto-optic modulating element is stopped, the illuminated position of the laser beam on the reflecting mirror moves in the main scanning direction on the reflecting mirror by a distance $l_0$ from the reflected position on the reflecting mirror of the laser beam received by the sensor, wherein $l_0 < l$.

11. A scanning optical unit comprising:

an acousto-optic modulating element including an acousto-optic modulating medium and a transducer which generates ultrasonic waves, and when a laser beam emitted from a laser light source passes through the acousto-optic modulating medium, the acousto-optic modulating element diffracts the laser beam by ultrasonic waves inputted by the transducer;

a polygon mirror for deflecting, in a main scanning direction of a recording medium, the laser beam which was diffracted by the acousto-optic modulating element;

a reflecting mirror which is provided outside of an exposure region of the recording medium, and reflects the laser beam from the polygon mirror;

a sensor for determining a main scanning start position by receiving the laser beam reflected by the reflecting mirror; and an optical system containing an fθ lens, wherein a predetermined region of the recording medium is exposed by a laser beam deflected in the main scanning direction, and given that a focal length of the fθ lens is f, the main scanning speed which is the speed at which the laser beam moves on the recording medium is v, the distance between the reflecting mirror and an exposure surface of the recording medium is t, a distance from a reflection position on the reflecting mirror of the laser beam detected by the sensor to a recording medium side end portion of the reflecting mirror is l, a period of time from a time the laser beam reflected by the reflecting mirror is incident on the sensor to a time the acousto-optic modulating element is operated is τ, and a propagation speed of ultrasonic waves through the acousto-optic modulating medium at a time the acousto-optic modulating element is operated is V, adjustment is carried out such that a distance L from a diffraction position within the acousto-optic modulating medium to the transducer is $L < V \cdot [l \cdot f / \{v \cdot (f-t)\} - \tau]$.

12. A scanning optical unit according to claim 11, wherein the scanning optical unit is connected to a control means, and when the sensor detects the laser beam, the control means temporarily stops the acousto-optic modulating element, and starts operation of the acousto-optic modulating element again at the time when the laser beam has reached a main scanning start position of the recording medium, so as to carry out exposure of the recording medium.

13. A scanning optical unit according to claim 12, wherein from the time the acousto-optic modulating element is stopped to the time diffraction of the laser beam is actually stopped, there is a time lag which corresponds to the propagation speed V and the distance L, and due to this time lag, after the acousto-optic modulating element is stopped, the illuminated position of the laser beam on the reflecting mirror moves in the main scanning direction on the reflecting mirror by a distance $l_0$ from the reflected position on the reflecting mirror of the laser beam received by the sensor, wherein $l_0 < l$.

14. A scanning optical unit comprising:

an acousto-optic modulating element including an acousto-optic modulating medium and a transducer which generates ultrasonic waves, and when a laser beam emitted from a laser light source passes through the acousto-optic modulating medium, the acousto-optic modulating element diffracts the laser beam by ultrasonic waves inputted by the transducer;

a polygon mirror for deflecting, in a main scanning direction of a recording medium, the laser beam which was diffracted by the acousto-optic modulating element;

a reflecting mirror which is provided outside of an exposure region of the recording medium, and reflects the laser beam from the polygon mirror;

a sensor for determining a main scanning start position by receiving the laser beam reflected by the reflecting mirror; and an optical system containing an fθ lens, wherein a predetermined region of the recording medium is exposed by a laser beam deflected in the main scanning direction, and given that a focal length of the fθ lens is f, the main scanning speed which is the speed at which the laser beam moves on the recording medium is v, the distance between the reflecting mirror and an exposure surface of the recording medium is t, a propagation speed of ultrasonic waves through the acousto-optic modulating medium at a time the acousto-optic modulating element is operated is V, a period of time from a time the laser beam reflected by the reflecting mirror is incident on the sensor to a time the acousto-optic modulating element is operated is τ and a distance from a diffraction position within the acousto-optic modulating medium to the transducer is L, adjustment is carried out such that a distance l from a reflection position on the reflecting mirror of the laser beam detected by the sensor to a recording medium side end portion of the reflecting mirror is $$l > \{(L/V) + \tau\} \cdot \{v \cdot (f-t)/f\}.$$

15. A scanning optical unit according to claim 14, wherein the scanning optical unit is connected to a control means, and when the sensor detects the laser beam, the control means temporarily stops the acousto-optic modulating element, and starts operation of the acousto-optic modulating element again at the time when the laser beam has reached a main scanning start position of the recording medium, so as to carry out exposure of the recording medium.

16. A scanning optical unit according to claim 15, wherein from the time the acousto-optic modulating element is stopped to the time diffraction of the laser beam is actually stopped, there is a time lag which corresponds to the propagation speed V and the distance L, and due to this time lag, after the acousto-optic modulating element is stopped, the illuminated position of the laser beam on the reflecting mirror moves in the main scanning direction on the reflecting mirror by a distance $l_0$ from the reflected position on the reflecting mirror of the laser beam received by the sensor, wherein $l_0 < l$.

17. A scanning optical unit comprising:

an acousto-optic modulating element including an acousto-optic modulating medium and a transducer which generates ultrasonic waves, and when a laser beam emitted from a laser light source passes through the acousto-optic modulating medium, the acousto-optic modulating element modulates an intensity of the laser beam by ultrasonic waves inputted by the transducer;

main scanning/deflecting means for deflecting, in a main scanning direction of a recording medium, the laser beam whose intensity was modulated by the acousto-optic modulating element;

an optical system including an fθ lens;

a reflecting mirror which is provided outside of an exposure region of the recording medium, and reflects the laser beam from the main scanning/deflecting means; and a sensor for determining a main scanning start position by receiving the laser beam reflected at a predetermined position of the reflecting mirror, wherein the recording medium is scanned and exposed by said main scanning/deflecting means and said optical system including the fθ lens, and given that a focal length of the fθ lens is f, the main scanning speed which is the speed at which the laser beam moves on the recording medium is v, the distance between the reflecting mirror and an exposure surface of the recording medium is t, a distance from a reflection position on the reflecting mirror of the laser beam detected by the sensor to a recording medium side end portion of the reflecting mirror is l, a period of time from a time the laser beam reflected by the reflecting mirror is incident on the sensor to a time the acousto-optic modulating element is operated is τ, and a propagation speed of ultrasonic waves through the acousto-optic modulating medium at a time the acousto-optic modulating element is operated is V, adjustment is carried out such that a distance L from an intensity modulation position within the acousto-optic modulating medium to the transducer is $$L < V \cdot [l \cdot f / \{v \cdot (f-t)\} - \tau].$$

18. A scanning optical unit comprising:

an acousto-optic modulating element including an acousto-optic modulating medium and a transducer which generates ultrasonic waves, and when a laser beam emitted from a laser light source passes through the acousto-optic modulating medium, the acousto-optic modulating element modulates an intensity of the laser beam by ultrasonic waves inputted by the transducer;

main scanning/deflecting means for deflecting, in a main scanning direction of a recording medium, the laser beam whose intensity was modulated by the acousto-optic modulating element;

an optical system including an fθ lens;

a reflecting mirror which is provided outside of an exposure region of the recording medium, and reflects the laser beam from the main scanning/deflecting means; and a sensor for determining a main scanning start position by receiving the laser beam reflected at a predetermined position of the reflecting mirror, wherein the recording medium is scanned and exposed by said main scanning/deflecting means and said optical system including the fθ lens, and given that a focal length of the fθ lens is f, the main scanning speed which is the speed at which the laser beam moves on the recording medium is v, the distance between the reflecting mirror and an exposure surface of the recording medium is t, a propagation speed of ultrasonic waves through the acousto-optic modulating medium at a time the acousto-optic modulating element is operated is V, a period of time from a time the laser beam reflected by the reflecting mirror is incident on the sensor to a time the acousto-optic modulating element is operated is τ, and a distance from an intensity modulation position within the acousto-optic modulating medium to the transducer is L, adjustment is carried out such that a distance l from a reflection position on the reflecting mirror of the laser beam detected by the sensor to a recording medium side end portion of the reflecting mirror is $$l > \{(L/V) + \tau\} \cdot \{v \cdot (f-t)/f\}.$$

* * * * *